United States Patent [19]

Sterrett

[11] 4,445,445
[45] May 1, 1984

[54] APPARATUS FOR FERTILIZING SOIL WITH A V-BLADE PLOW

[76] Inventor: Richard L. Sterrett, P.O. Box 339, Quinter, Kans. 67752

[21] Appl. No.: 382,948

[22] Filed: May 28, 1982

[51] Int. Cl.³ .............................................. A01C 23/02
[52] U.S. Cl. .......................................... 111/7; 111/73
[58] Field of Search ..................... 111/1, 6, 7, 73, 80, 111/86; 47/DIG. 6

[56] References Cited

U.S. PATENT DOCUMENTS

| 2,781,612 | 2/1957 | Dugan | 111/7 X |
| 2,889,788 | 6/1959 | Van Dorn | 111/73 X |
| 3,605,657 | 9/1971 | Brannan | 111/7 |
| 3,854,429 | 12/1974 | Blair | 111/86 X |

FOREIGN PATENT DOCUMENTS

| 530673 | 9/1956 | Canada | 111/7 |
| 393970 | 12/1973 | U.S.S.R. | 111/86 |

*Primary Examiner*—James R. Feyrer
*Attorney, Agent, or Firm*—Edwin L. Spangler, Jr.

[57] ABSTRACT

This invention relates to an improved apparatus for applying a combination of liquid and gaseous fertilizers while at the same time tilling the ground which comprises providing the trailing edge of a conventional V-blade plow with an orificed pipe through which liquid anhydrous ammonia is pumped under pressure and a plurality of open-ended drop feeder pipes having their open ends terminating alongside one of the ammonia outlets through which the liquid phosphate issues in close proximity, say three inches or closer, to where the ammonia is dispensed. The invention also encompasses the unique method of introducing nitrogen and phosphorous into the soil so as to take advantage of the known phenomenon wherein the ammonium ion ($NH_4+$) stimulates the utilization of the phosphorous which includes the steps of tilling the ground to a shallow depth using a V-blade plow, injecting anhydrous ammonia under pressure into the freshly tilled ground immediately after the plow has passed therethrough and freely dropping liquid fertilizer containing soluble phosphates no farther than approximately three inches from where the anhydrous ammonia has been deposited.

6 Claims, 8 Drawing Figures

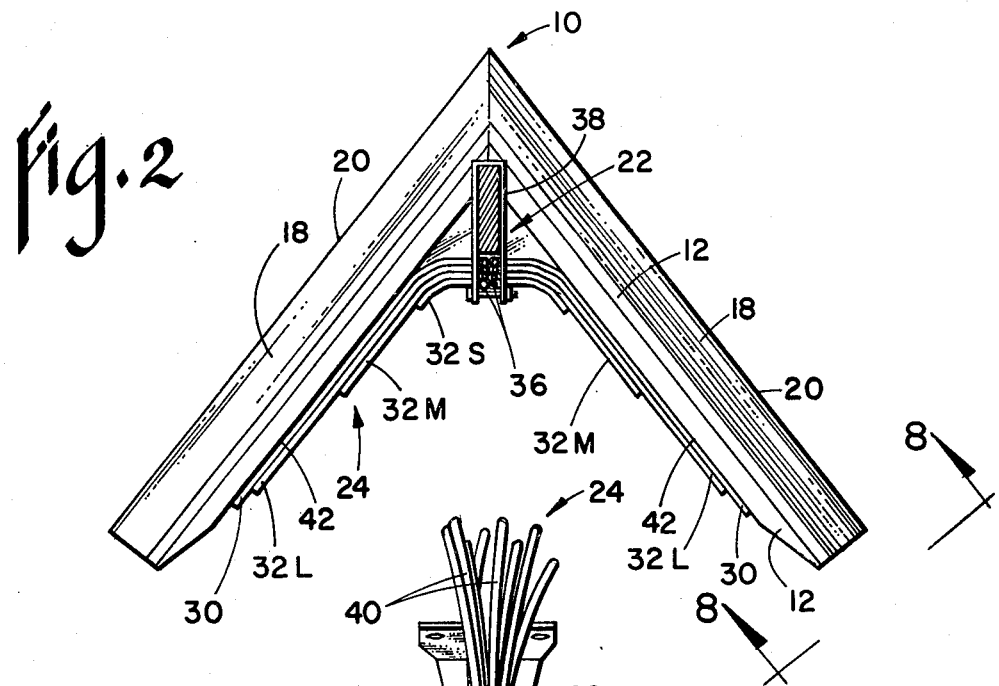
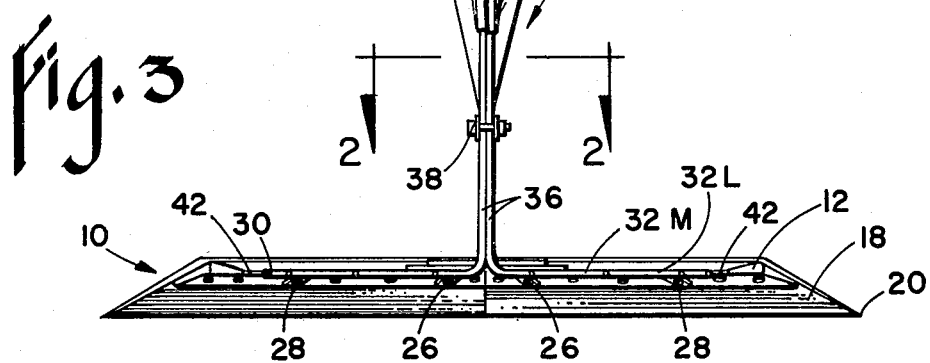
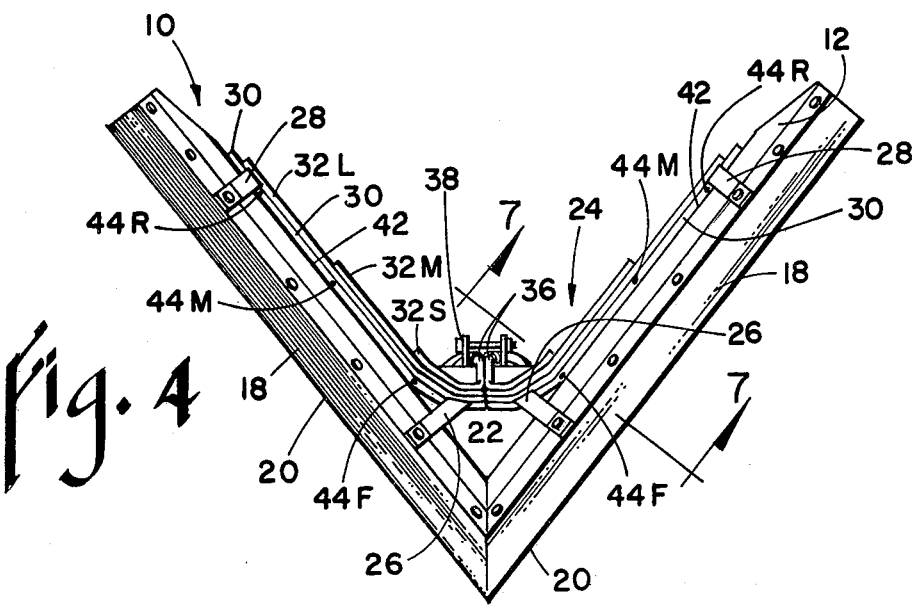

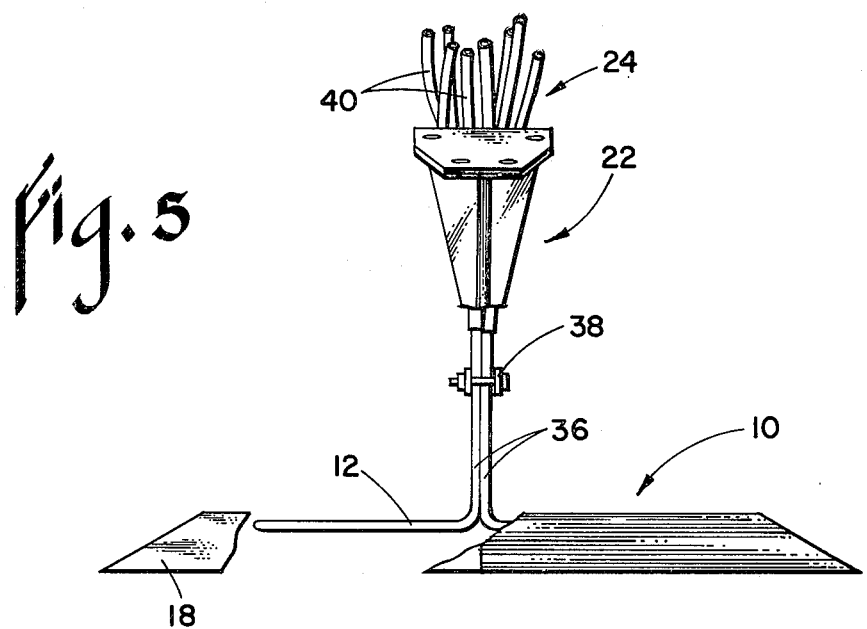
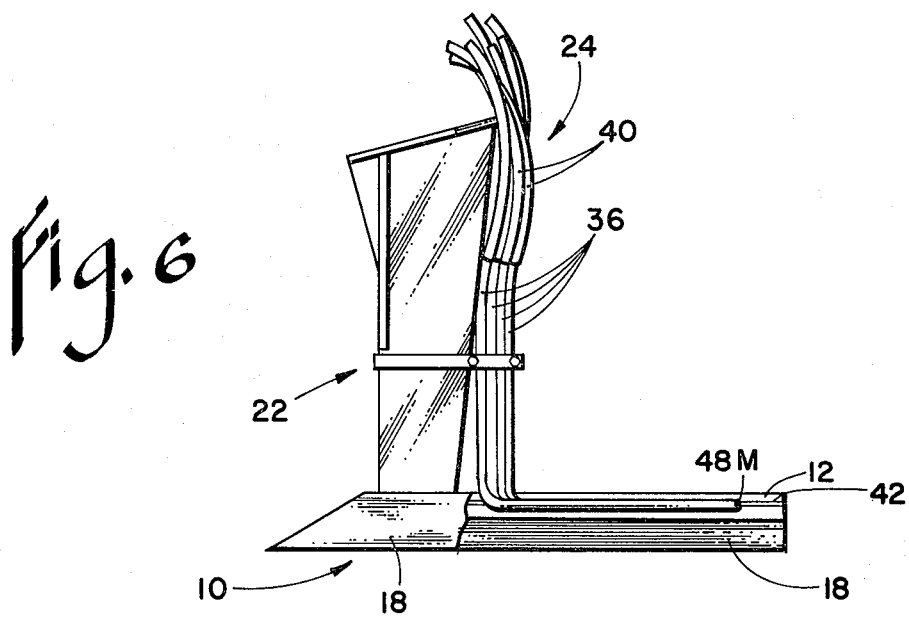
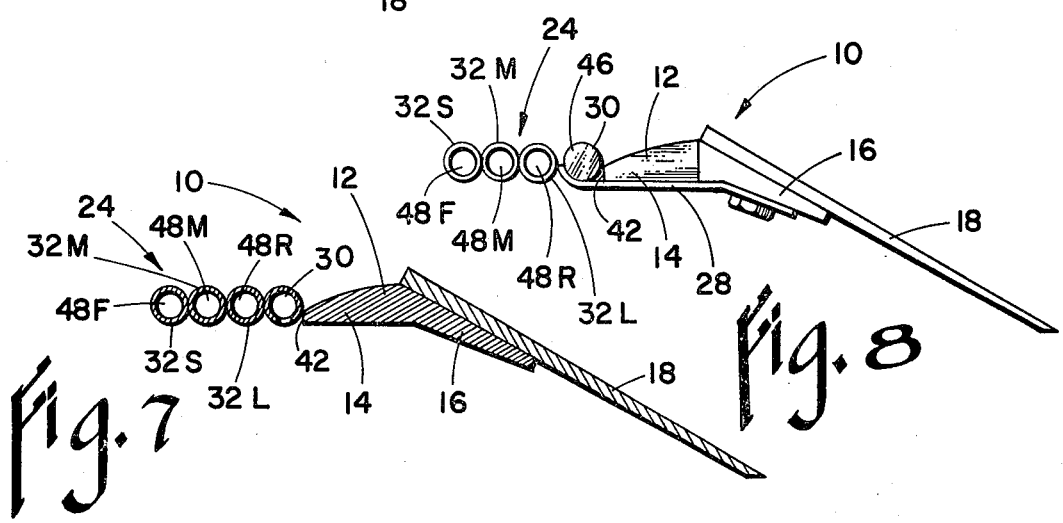

APPARATUS FOR FERTILIZING SOIL WITH A V-BLADE PLOW

Agronomists have known for some time that the utilization of phosphorous in fertilizers is significantly enhanced by the presence of the ammonium ion. Soluble phosphate compounds provide a convenient and inexpensive source of phosphorous while anhydrous ammonia is generally employed as the source of nitrogen. Broadcast application of the sources of nitrogen and phosphorous have proven to be both expensive ($2.50/acre) and less effective than introducing them directly into the soil using chisel plows. The latter technique, while effective, still necessitated tilling the field during a second separate operation. At the present and expected future cost of fuel, having to rework a field or go over it twice doing different things each time becomes a prohibitive expense.

Combining the tillage and fertilizing functions in a single operation has also been tried with moderate success using V-blade plows and dispensing both the ammonia and source of phosphorous in liquid form through orificed pipes beneath the plow blade. Anhydrous ammonia, however, is highly hydroscopic and its refrigerant properties prevent its being mixed with or even used in close association with the liquid phosphates or the phosphate lines tend to freeze. Thus, the ammonia must be dispensed through one line and the phosphates through another far enough away that it doesn't freeze.

Despite the necessity for separating the ammonia and phosphate delivery tubes to prevent freeze-up of the latter, recent studies at Kansas State University have shown that the ammonia migrates only a very short distance from the point at which it was introduced and, for this reason, the benefits resulting from the interaction between the ammonium ion and the phosphorous are somewhat difficult to attain. Couple this with the fact that liquid phosphate compounds usually contain undissolved crystals that plug up the jets of the distributor and nullify the whole effect of the combination. Moreover, the size, type and location of the distributor pipes underneath and at the leading edge of the V-blade sweep has been such that they become worn, crimped, bent and otherwise damaged as they traverse the field hitting rocks and hard dirt clods in the soil.

It has now been found in accordance with the teaching of the instant invention that these and other shortcomings of the prior art methods and equipment for simultaneously tilling and fertilizing soil with a mixture of nutrients containing nitrogen and phosphorous can be overcome by the novel, yet unexpected method of forcing anhydrous ammonia down into the soil by discharging same under pressure from jets located along the elevated trailing edge of a V-blade plow followed immediately by dropping a soluble phosphate solution within a space of approximately three inches of where the anhydrous ammonia has been deposited using a plurality of open-ended tubes terminating alongside the ammonia dispensing jets. The apparatus for carrying out the aforesaid method consists of a plurality of pipes or tubes positioned in side-by-side relation paralleling the ground depending from the elevated and angled trailing edges of a V-blade plow or implement sweep. The front or lead pipe of the group has the upper end thereof connected to a pressurized source of liquified anhydrous ammonia which is introduced into the freshly plowed soil through jets preferably located some 40 cm. apart laterally in accordance with the Kansas State University distribution studies. The open outlet ends of the remaining tubes in trailing relation to the first or lead tube are staggered to lie directly behind and in close proximity to (within three inches of) the ammonia discharge jet. Commercially available metering devices like, for example, what is being sold as the "Green Drop Flow Divider" and other similar units are used to dispense a measured amount of the material to the distribution pipes of each set.

It is, therefore, the principal object of the present invention to provide a novel and improved method for introducing both nitrogen and phosphate values into the soil in such a fashion that the former enhances the utilization of the latter while, at the same time, tilling the soil.

A second objective is the provision of an apparatus for carrying out the aforesaid method using an orificed pipe for distributing the anhydrous ammonia under pressure followed closely by gravity drop pipes positioned and adapted to dispense the phosphate values where they can be enhanced by the ammonia.

Another object of the invention herein disclosed and claimed is to provide a method and apparatus for fertilizing the soil that maximizes the synergistic interaction between the ammonium ion and phosphorous.

Still another objective is to provide apparatus of the character described which eliminates the clogging problems that plagued the prior art phosphate distributors.

An additional object is to provide means associated with a V-blade plow for distributing fertilizer that is so positioned relative to the latter that it is shielded from damage thereby while, at the same time, remaining located to dispense the fertilizer into the freshly tilled soil.

Further objects are to provide an apparatus for use with a V-blade plow to apply two different kinds of liquid fertilizer which is simple, inexpensive, rugged, dependable, versatile, easy to use, readily adaptable to various sizes and styles of V-blade sweeps, and even decorative.

Other objects will be in part apparent and in part pointed out specifically hereinafter in connection with the description of the drawings that follows, and in which:

FIG. 2 is a section to a reduced scale taken along line 2—2 of FIG. 3;

FIG. 3 is a rear elevation of the assembly;

FIG. 4 is a bottom plan view of the assembly;

FIG. 5 is a front elevation of the assembly;

FIG. 6 is a left side elevation of the assembly;

FIG. 7 is a fragmentary section to a greatly enlarged scale taken along line 7—7 of FIG. 6; and, FIG. 8 is an end view to the same scale as FIG. 7 as seen in the direction of 8—8 of FIG. 2.

Figure 1:
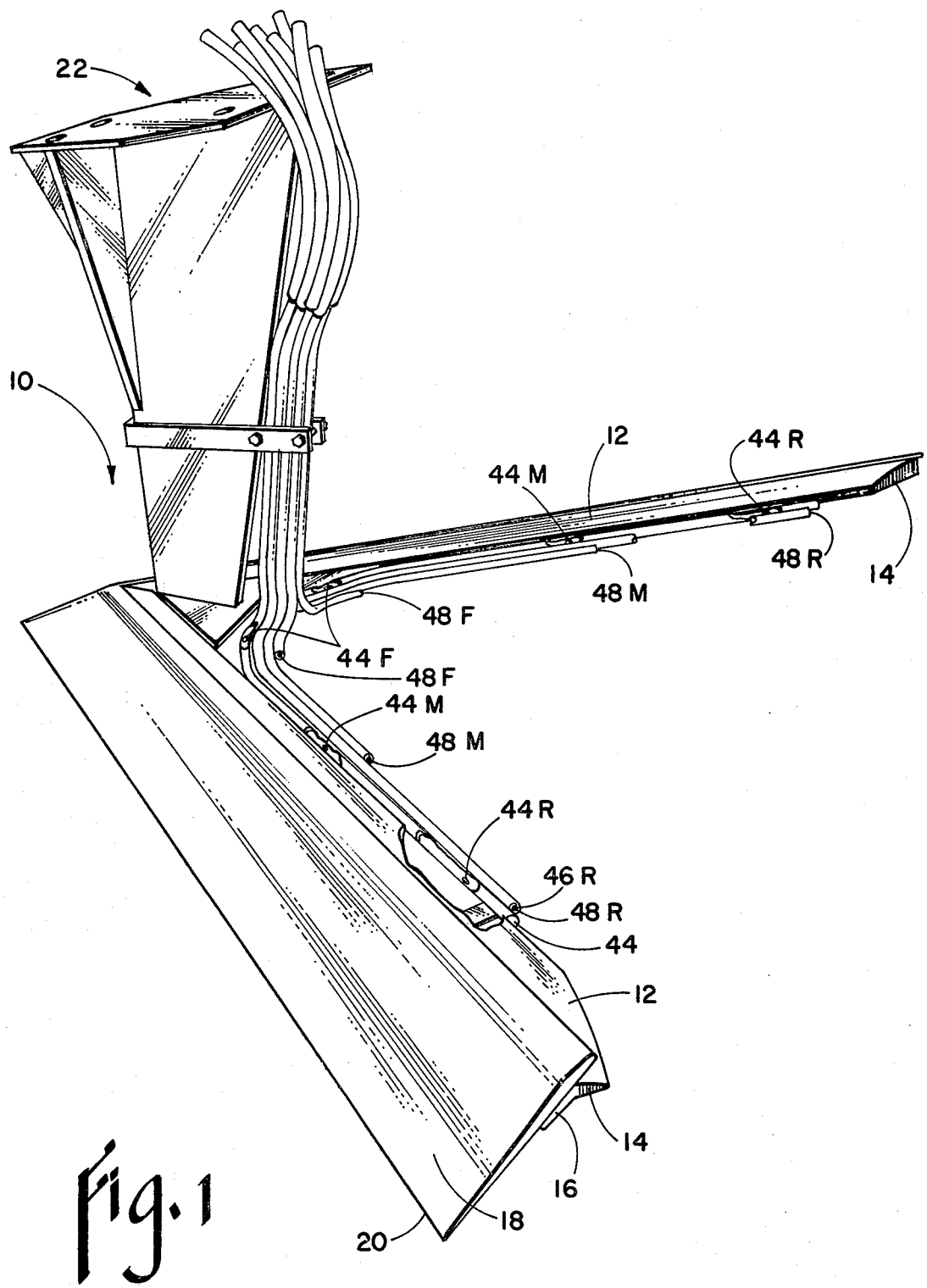
FIG. 1 is a perspective view showing a V-blade plow and mounting bracket therefor equipped with the jet-equipped anhydrous ammonia distribution pipe and the several (three) gravity-drop pipes therebehind, each of which drops its charge of liquid phosphate or the like directly behind one of the anhydrous ammonia drop points.

Referring next to the drawings for a detailed description of the present invention, reference numeral 10 broadly identifies a conventional commercially available V-blade plow having a so-called "frog" 12 made up of a horizontally-disposed heavy metal flange 14 on the trailing edge thereof and a downwardly inclined angled flange 16 on the leading edge, all of which are most clearly revealed in FIGS. 1, 7 and 8. Bolted to the downturned flanges 16 of the frog are plow blades 18 (see FIGS. 3, 4 and 8) terminating in sharpened leading edges 20. These blades are suitably beveled and joined together at their front ends so as to define an acute angle therebetween as shown in FIGS. 2 and 4 of just slightly less than 90°. A vertically-disposed mounting bracket subassembly generally indicated by numeral 22 and revealed in FIGS. 1–6 is used to mount the blade on a suitable wheeled support structure that has not been illustrated.

The novel aspects of the fertilizer distribution apparatus lie not in the plow 10, but rather, in the tube bundle indicated broadly by reference numeral 24 and with the method of using same. In the particular form illustrated, it can be seen that a set of four tubes in all are arranged in horizontally-disposed side-by-side relation along the trailing edge of each V-blade plow or sweep. More specifically, as best seen in FIGS. 4 and 8, brackets 26 and 28 bolted to the underside of the frog support the front tube 30 of the set, this particular tube differing significantly from the other three (32S, 32M and 32L) in a manner and for a purpose which will be set forth in detail presently.

The upstanding legs 36 of all eight tubes are retained and fastened to plow-mounting subassembly 22 by means of a clamp member 38 of conventional design. In the particular form shown, tubes 30 and 32 are rigid and joined at their upper or intake ends to flexible extension tubes 40 which complete the connection to either the drop feeder or the pressurized source of anhydrous ammonia, neither of which has been illustrated, the latter being merely a pressurized tank.

Now, the novelty in the apparatus is two-fold, namely, in its placement relative to the plow blade and, secondly, in the dispensing system itself. As far as placement is concerned, the horizontal runs of all eight tubes are disposed adjacent to and in shielded position behind the trailing edge 42 of the plow frog all of which has been most clearly revealed in FIGS. 7 and 8. As such, the tubes are elevated out of contact with the untilled soil and, therefore, any that impacts the distribution system will, for the most part, be broken up to a point where it will not damage the pipeage. The major part of the soil riding up over the top of the blade 18 will, of course, be wedged aside by the steeply-inclined surface thereof.

The four tubes on each side are welded or otherwise permanently attached to one another in side-by-side relation. Only the front tube 30 of the set is orificed in the bottom, there being in the particular form shown, only three such orifices, one 44F near the front end of the blade, a second 44M in the middle, and a third 44R near the rear, these orifices having been shown in FIGS. 1 and 4. Obviously, more than three such orifices per side can be used depending upon the length of the blades and the optimum transverse spacing therebetween measured at right angles to the direction of plow travel. Only the rear end of pipes 30 are closed by a plug 46 (FIG. 8) while the remaining lines 32 all are open-ended but have no orifices corresponding to 44. The most significant feature is that each of the aforesaid open ends 48F, 48M and 48R lie, respectively, closely adjacent to and immediately behind the discharge orifices 44F, 44M and 44R of tube 30. The front plugged tube 30 is the one of the four on each side that is force fed with the anhydrous ammonia under pressure which issues therefrom through all three of the orifices 44F, 44M and 44R. Tubes 32S, 32M and 32L, on the other hand, are each charged with a measured amount of phosphate-bearing liquid which gravitates through the open end thereof and drops to the ground within approximately three inches or less of the point where the anhydrous ammonia is discharged through one of the tube 30 orifices 44. By so doing, the mixing of the two nitrogen and phosphorous-bearing compounds is insured as the former leaches through the soil and interacts with the latter so as to produce the well-known enhanced response.

The improved method of introducing and combining nitrogen and phosphorous-bearing compounds "in situ" into the soil while, at the same time, tilling same using the above described apparatus, consists of the steps of spraying anhydrous ammonia into the freshly tilled soil under pressure at discrete transversely-spaced intervals followed by immediately dropping soluble phosphates in liquid form in such close proximity to the ammonia thus laid down that the two will combine. This method and apparatus allow the farmer to both till and fertilize the soil with a single pass and to take advantage of the known synergistic action of the two ingredients while, at the same time, protecting the equipment from damage and keeping the phosphate lines free flowing.

What is claimed is:

1. For use in combination with a V-blade plow having downwardly and forwardly-inclined angularly-disposed blades with leading edges for plowing and trailing edges elevated therebehind, the improved distribution system for placing two different types of liquid fertilizer into the freshly plowed ground and mixing same "in situ" which comprises: a first tubular member having an inlet connectable to a pressurized source of nitrogen-bearing fertilizer in liquid form, a horizontally-disposed portion fastened to the trailing edge of each plow blade in shielded relation therebehind, means defining a closure for the end of said horizontal portion remote from the inlet, and at least two downwardly-directed discharge orifices for dispensing said nitrogen-bearing liquid fertilizer received from the pressurized source thereof directly into the plowed ground in transversely-spaced rows; and, other tubular members corresponding to each of the discharge orifices in the first pipes connected alongside thereof in trailing relation thereto, said other tubular members each having an inlet connectable to an unpressurized source of phosphorous-bearing fertilizer in liquid form and a single outlet for dropping same onto the ground immediately behind and to the nitrogen-bearing fertilizer issuing from one of the orifices in the first tubular member.

2. The improved liquid fertilizer distribution system as set forth in claim 1 wherein: the outlets in said other tubes comprise open ends remote from the inlet ends thereof.

3. The improved liquid fertilizer distribution system as set forth in claim 1 wherein: the other tubes next adjacent the first tubes have their outlets proximal to the rearward-most orifice of said first tubular members.

4. The improved liquid fertilizer distribution system as set forth in claim 1 wherein: a most central set tubular members of said other tubes have their outlets proximal to the forward-most orifice of said first tubular members.

5. The improved liquid fertilizer distribution system as set forth in claim 1 wherein: said other tubular members lie in horizontally-disposed side-by-side relation alongside one another and alongside said first tubular members.

6. The improved liquid fertilizer distribution system as set forth in claim 1 wherein: the outlets of said other tubular members are positioned relative to their responding orifices in said first tubular members such that the phosphorous-bearing fertilizer is dispensed within approximately three inches or less of the nitrogen-bearing fertilizer.

* * * * *